US006220449B1

(12) United States Patent
Schulte, Jr. et al.

(10) Patent No.: US 6,220,449 B1
(45) Date of Patent: Apr. 24, 2001

(54) FLAT TOP CLOTH SUPPORT SCREEN

(75) Inventors: David L. Schulte, Jr., Broussar, LA (US); Kenneth W. Seyffert, Houston, TX (US); Thomas C. Adams, Hockley, TX (US); Charles N. Grichar, Houston, TX (US)

(73) Assignee: Tuboscope I/P, Inc., Houston, TX (US)

( * ) Notice: Subject to any disclaimer, the term of this patent is extended or adjusted under 35 U.S.C. 154(b) by 0 days.

(21) Appl. No.: 09/410,775

(22) Filed: Oct. 1, 1999

(51) Int. Cl.$^7$ ........................................ B07B 1/49
(52) U.S. Cl. ................ 209/401; 209/403; 209/392; 209/409
(58) Field of Search .................. 209/401, 400, 209/392, 402, 403, 409

(56) References Cited

U.S. PATENT DOCUMENTS

| | | | |
|---|---|---|---|
| 399,616 | * 3/1889 | Hurford | 209/401 |
| 485,488 | * 11/1892 | Cockrell | 209/401 |
| 966,599 | * 8/1910 | Reynolds | 209/401 |
| 1,078,380 | * 11/1913 | Reynolds | 209/401 |
| 1,098,979 | 6/1914 | Schuchard . | |
| 1,139,468 | * 5/1915 | Potter | 209/401 |
| 1,139,469 | * 5/1915 | Potter | 209/401 |
| 1,814,598 | * 7/1931 | Hermann . | |
| 1,832,518 | * 11/1931 | Wettlaufer | 209/401 |
| 1,947,307 | 2/1934 | Rafton . | |
| 2,082,513 | 6/1937 | Roberts . | |
| 2,723,032 | 11/1955 | Gisler et al. . | |
| 2,929,464 | 3/1960 | Sprouse . | |
| 2,984,357 | * 5/1961 | Kufferath | 209/401 |
| 3,165,473 | 1/1965 | Pall et al. | 210/510 |
| 3,716,138 | 2/1973 | Lumsden | 209/401 |
| 3,789,498 | 2/1974 | Cole | 29/470.9 |
| 4,472,473 | 9/1984 | Davis et al. | 428/184 |
| 4,491,517 | 1/1985 | Janovac | 209/401 |
| 4,575,421 | 3/1986 | Derrick et al. | 209/397 |
| 4,696,751 | 9/1987 | Eifling | 210/780 |
| 4,728,422 | 3/1988 | Bailey | 210/314 |
| 4,819,809 | 4/1989 | Derrick | 209/275 |
| 4,857,176 | 8/1989 | Derrick et al. | 209/392 |
| 4,882,054 | 11/1989 | Derrick et al. | 210/389 |
| 4,892,767 | 1/1990 | Freissle | 428/52 |
| 5,221,008 | 6/1993 | Derrick, Jr. et al. | 209/269 |
| 5,256,291 | 10/1993 | Cagle | 210/499 |
| 5,330,057 | 7/1994 | Schiller et al. | 209/392 |
| 5,417,859 | 5/1995 | Bakula | 210/388 |
| 5,636,749 | 6/1997 | Wojciechowski | 209/403 |
| 5,720,881 | 2/1998 | Derrick et al. | 210/388 |

(List continued on next page.)

FOREIGN PATENT DOCUMENTS

712190 * 10/1941 (DE) ...................... 209/401

OTHER PUBLICATIONS

McNally Coal Preparation Manual M 576, pp. iii, 73–96, 216 (1978).
Universal Wire Cloth, Stock List, pp. 23, 25, 1997.
Fluid Processing Equipment for the Drilling and Environmental Industries, Tri–Flow, 1996.
Replacement Screens For Solids Control Equipment, Southwestern Wire Cloth, Mar. 1998.
Supertaut Mud Cleaner Screens, Sweco Oilfield Services, 1992.
The VSM 100 Shale Shaker Technical Specification, Thule Rigtech, 1997.

Primary Examiner—Donald P. Walsh
Assistant Examiner—Daniel K Schlak
(74) Attorney, Agent, or Firm—Guy McClung

(57) ABSTRACT

A screen for a vibratory shaker for treating material flowing thereto, the screen in certain aspects having a lower support made of criss-crossed wires which define a plurality of spaced-apart holes through the lower support, the wires having top surfaces with a substantially flat portion, and screening material on the top surfaces of the wires.

15 Claims, 5 Drawing Sheets

U.S. PATENT DOCUMENTS

| | | | |
|---|---|---|---|
| 5,868,929 | 2/1999 | Derrick et al. | 210/388 |
| 5,876,552 | 3/1999 | Bakula | 156/308.2 |
| 5,944,197 * | 8/1999 | Baltzer et al. | 209/401 |
| 5,944,993 | 8/1999 | Derrick et al. | 210/388 |
| 5,958,236 | 9/1999 | Bakula | 210/388 |
| 5,967,336 | 10/1999 | Baltzer et al. | 209/403 |
| 6,000,556 | 12/1999 | Bakula | 210/388 |
| 6,000,558 | 12/1999 | Proulx et al. | 210/486 |

* cited by examiner

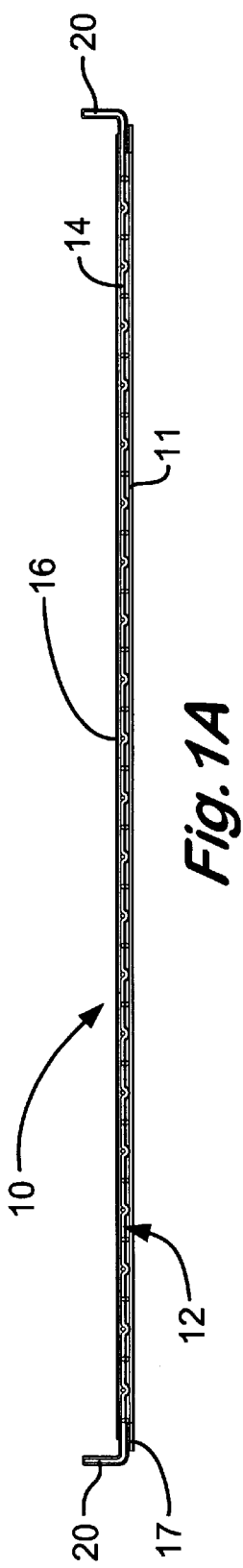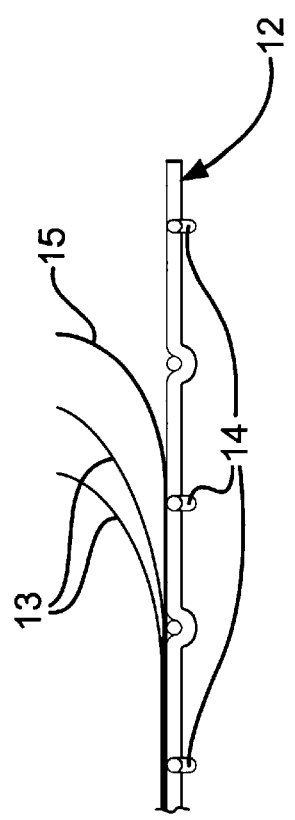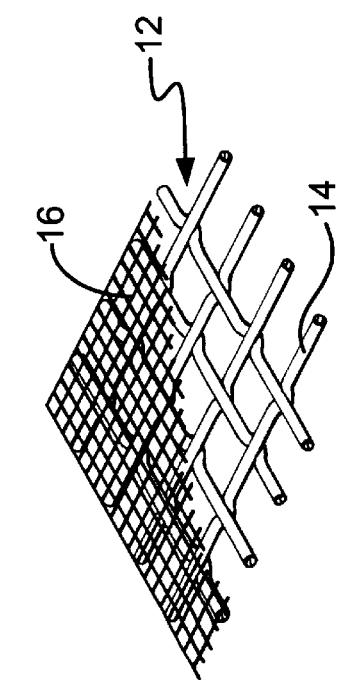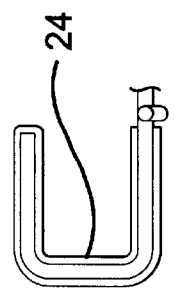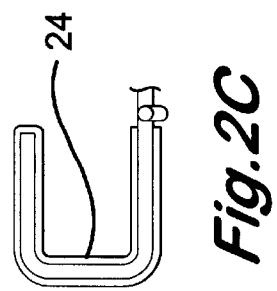

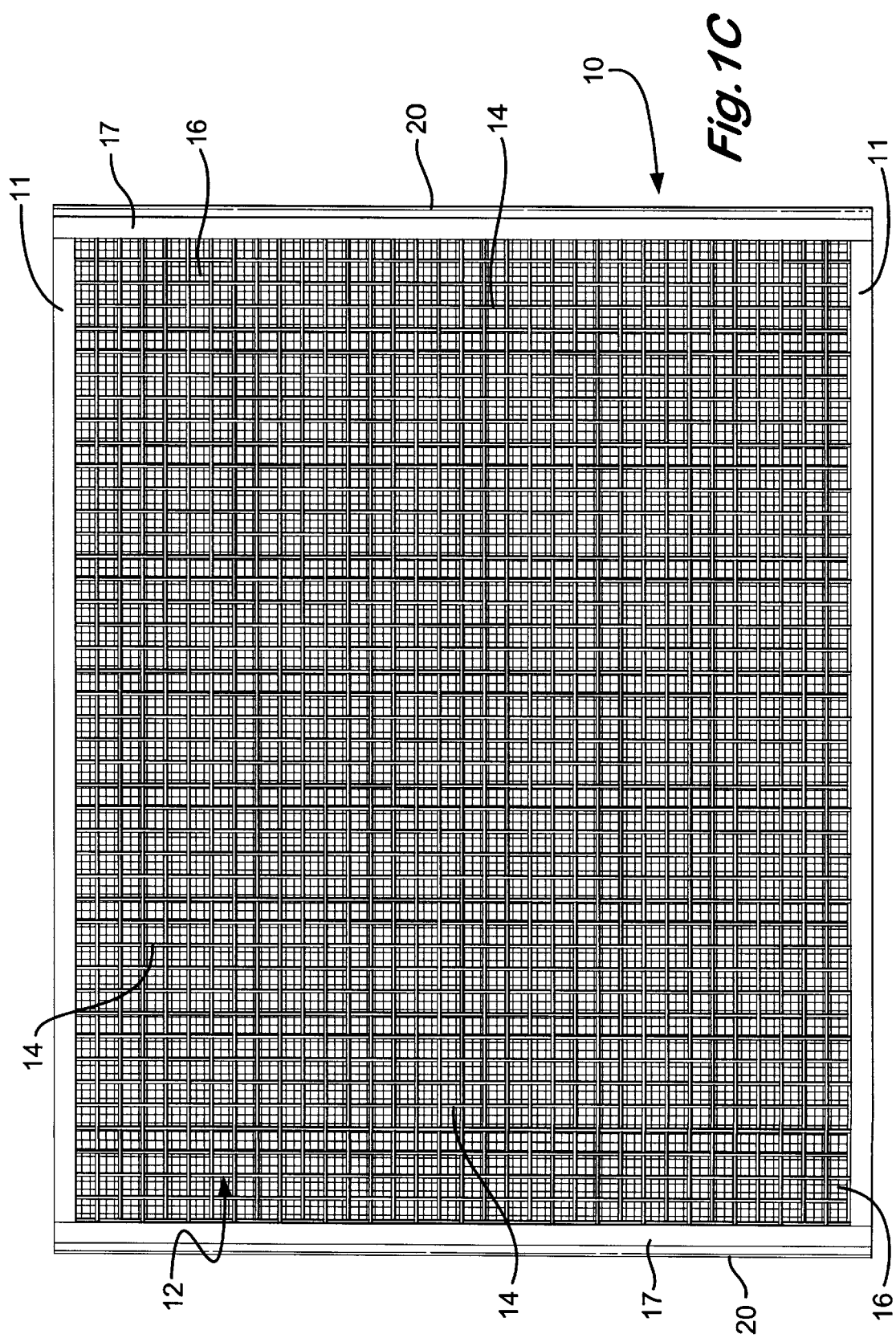

FLAT TOP CLOTH SUPPORT SCREEN

BACKGROUND OF THE INVENTION

1. Field of the Invention

The present invention is directed to filtering and classifying material with vibratory separators and shale shakers; to screens for such separators and shakers; and to such apparatuses useful for both dewatering and classification.

2. Description of Related Art

Vibrating screens have been employed for many years to separate particles in a wide array of industrial and oilfield applications. One common application of vibrating screens is in drilling operations to separate particles suspended in drilling fluids. The screens are generally flat or three-dimensional and are mounted generally horizontally on a vibrating mechanism or shaker that imparts either a rapidly reciprocating linear, elliptical and/or circular motion to the screen. Material from which particles are to be separated is poured onto a back end of the vibrating screen. The material generally flows toward the front end of the screen. Large particles are unable to move through the screen, remaining on top of the screen and moving toward the front of the screen where they are collected. The smaller particles and fluid flows through the screen and may be collected in a pan beneath the screen.

A vibrating screen may be formed from one or more layers of screening material, screen and/or wire mesh, which are generally described with reference to the diameter of the wires from which they are woven, the number wires per unit length (called a mesh count) and the shape or size of the openings between wires. The type of mesh chosen depends on the application. The screening material in certain prior art screens is mounted on a frame, a perforated plate or perforated panel.

Some screens use wire mesh that is tensioned. Tensioning (accomplished in a variety of ways, e.g. with hookstrips and/or pretensioned panels) restricts movement of the wires and assists in holding the shape of the wire mesh.

Multiple layers of mesh may be used to alleviate blinding. U.S. Pat. No. 4,033,865, describes layering two meshes in a manner that results in at least one wire of the lower of the two meshes bisecting each opening in the upper mesh. A third "backing" layer of relatively coarse, mill grade mesh is often used to carry most of the load on the screen and to increase the tensile strength of the screen.

Another problem faced in many applications is the tearing of a screen. The problem can be especially acute in heavy duty applications such as drilling and mining. A torn screen must be replaced or repaired. To facilitate repair, the screen layers are bonded to a rigid or semi-rigid support panel that has a pattern of openings, forming on the screen a plurality of cells of wire mesh. When a tear occurs in the screen, the mesh remaining within the cell in which the tear occurred is cut out and the cell is plugged. The capacity of the screen is diminished but its life is extended. Typically, several cells of a screen can be repaired before its capacity drops far enough to require replacement. Unfortunately, bonding the screen all around the edges defining openings through the support panel further restricts relative movement of the layers and the wires in each mesh layer.

Blinding and tearing of a screen reduce the capacity of the screen continually through its useful life. Although efficiency can be increased by increasing the total area the screens, the size of the screen is limited in most applications, such as on drilling rigs, especially those on offshore platforms. There has thus been generally a trade-off between capacity, longevity, repairability and resistance to blinding of the screens.

There has long been a need, recognized by the present inventors, for a screen assembly with a support which will enhance screen life and repairability with high fluid conductance and flow characteristics. There has long been a need for such a screen assembly which is durable and relatively non-blinding.

SUMMARY OF THE PRESENT INVENTION

A screen according to the present invention has, in certain embodiments, a lower support made of relatively thick wires (e.g., but not limited to between about $1/32$ inches thick to about $3/16$ inches thick or between about 0.100 inches to about 0.162 inches thick) with flat top surface portions or surfaces of the wires on which additional screening material is placed. In one aspect the majority of the area of all the top portions are in substantially one plane so that screening material placed on the top of the thick wires rests relatively flat. Since the tops of the thick wires are flat—i.e., the majority of the top surface portions or surfaces lie in the same horizonal plane—the screening material emplaced on the thick wires is not worn by points of a non-flat pointed weave pattern and does not assume an undulating shape. In other aspects, the flat wire assumes a relatively flat attitude without the "knuckles" present in many prior art screens. In other aspects according to the present invention, the flat-topped screen or cloth is formed into an undulating shape and then an upper screen or screens on top of the flat-topped screen or cloth assumes a corresponding undulating shape. Flat top wire cloth with such flat top surfaces, known in the prior art, is suitable for the lower support according to the present invention.

In one aspect screening material (any known screen or mesh in any known number of layers connected to and/or adhered to and/or sintered to and/or bonded and/or glued and/or welded together in any known way, or not connected together) is positioned on a lower support according to the present invention on the flat top surfaces of the wire. In certain aspects, the screening material is connected to, adhered to, welded to, glued to, sintered to and/or bonded to (all collectively herein henceforth referred to as "connected to") the top surfaces of the wires. In embodiments disclosed herein with "screening material" the screening material represents, inter alia, any screening material described above, including but not limited to, a single layer or multiple layers of such material. Flat-topped wire cloth is in some aspects referred to as "smooth top."

It is, therefore, an object of at least certain preferred embodiments of the present invention to provide:

A new, useful, unique, efficient, nonobvious screen for vibratory separators and shakers;

Such a screen with a lower support made of relatively thick wires with flat top surfaces;

Such a screen with the flat-topped wire cloth substantially in one horizontal plane, or in an undulating shape, and Methods for making such a screen.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1A is an end view of a screen according to the present invention. FIG. 1B is a top view and FIG. 1C is a bottom view of the screen of FIG. 1A. FIG. 1D is a perspective view of the screen of FIG. 1A. FIG. 1E is a side view of the screen of FIG. 1A.

FIGS. 2A–2C are end views of various hook attachments and hookstrips for a screen as described herein.

DESCRIPTION OF EMBODIMENTS PREFERRED AT THE TIME OF FILING FOR THIS PATENT

Figure 1B:
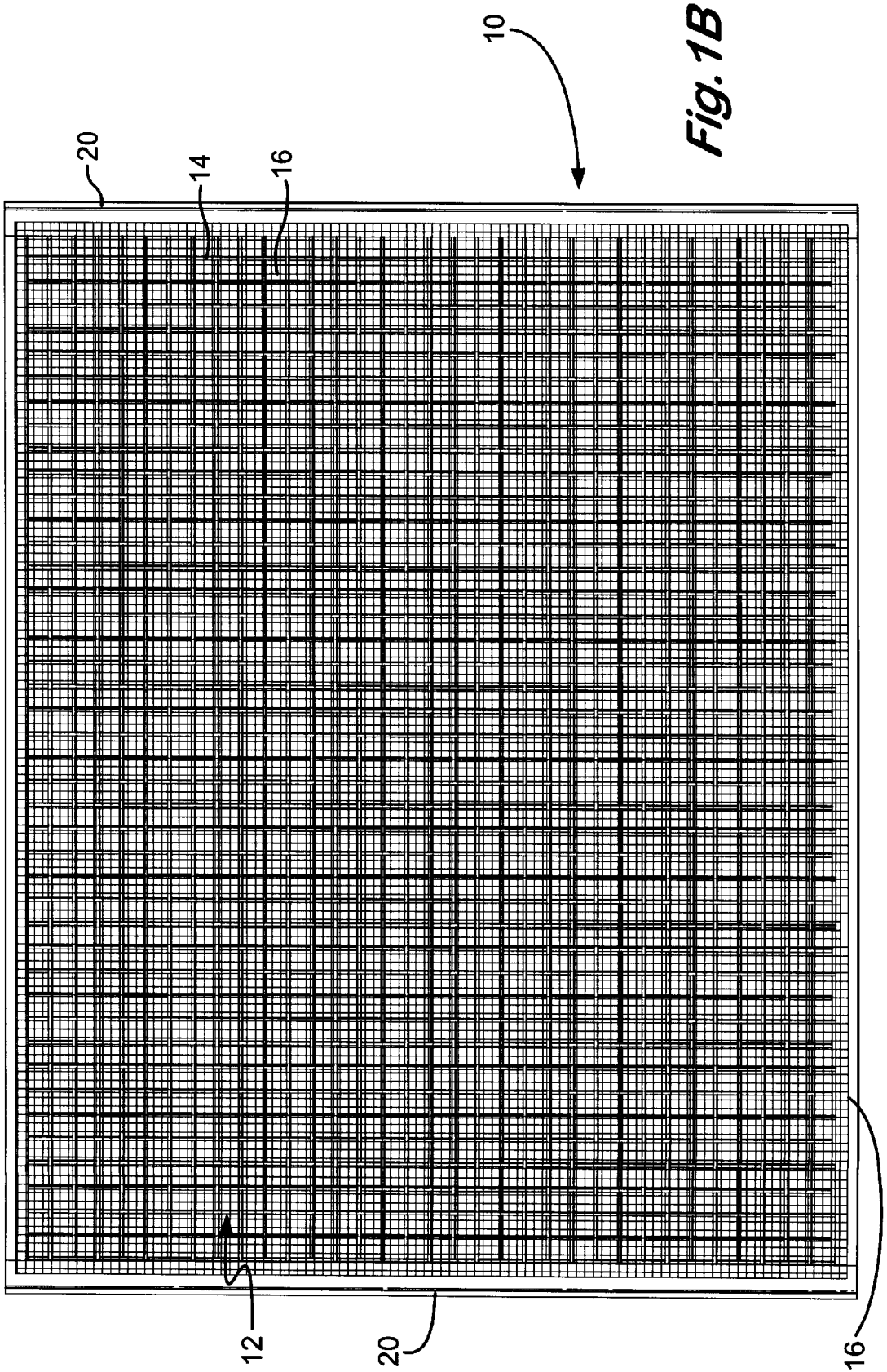

FIGS. 1A–1D show a screen 10 according to the present invention which has a lower support 12 made of thick wires 14. In certain preferred embodiments the wires 14 are 0.162 inches in diameter and the distance d between centers defined by the wires is about 1.162 inches. The screen has, optionally, one or two pairs of opposed spaced apart sides 11 and 17. The sides may be made of metal, plastic, aluminum, steel, PTFE, rubber, glue or other seal material.

Any suitable screening material 16 may be used on the lower support 12. In one particular embodiment (see FIG. 1D), the screening material includes two layers 13 of fine mesh screens (e.g. between 180 and 150 mesh), a layer 15 of wire mesh (e.g. about 32 mesh), all connected to and/or bonded together and to the lower support flat-topped wire cloth 12. In certain aspects the cloth 12 is between 0.75 mesh to 4 mesh.

In one method according to the present invention a piece of pre-heated flat top wire cloth about 36"×48⅛" (although any suitable size may be used) is hot dipped into a fluidized bed of powder coating to coat the wires. Screening material (one, two, or more layers) is then placed on the flat top wire cloth to form a sandwich which is placed on an oven at about 450 degrees F. for about 7 minutes. In one aspect the screening material pressed down onto the flat-topped wire cloth. Alternatively or in addition to the method described above, the screening material is sintered and/or welded to the flat-topped wire cloth, or adhered to it with spray-on glue.

The resulting screen is removed from the oven and cooled. Alternatively or in addition to such bonding any two adjacent layers of material may be sintered together and/or sintered to the flat-topped wire cloth.

In one aspect a lip or hookstrip is made on two opposed sides of a screen according to the present invention by bending opposed screen sides. The screen's edges may be finished by metal wrapping, welding, rubber or plastic wrapping or with glue.

FIG. 2A shows a hookstrip 20 made e.g. of sheet metal as on the screen 10 in FIG. 1A. FIG. 2B shows a hook angle 22, made e.g. of steel or galvanized steel which can be used instead of the hookstrip 20. FIG. 2C shows a channel hookstrip 24 made, e.g. of metal, rubber, or plastic which may also be used.

Figure 3:
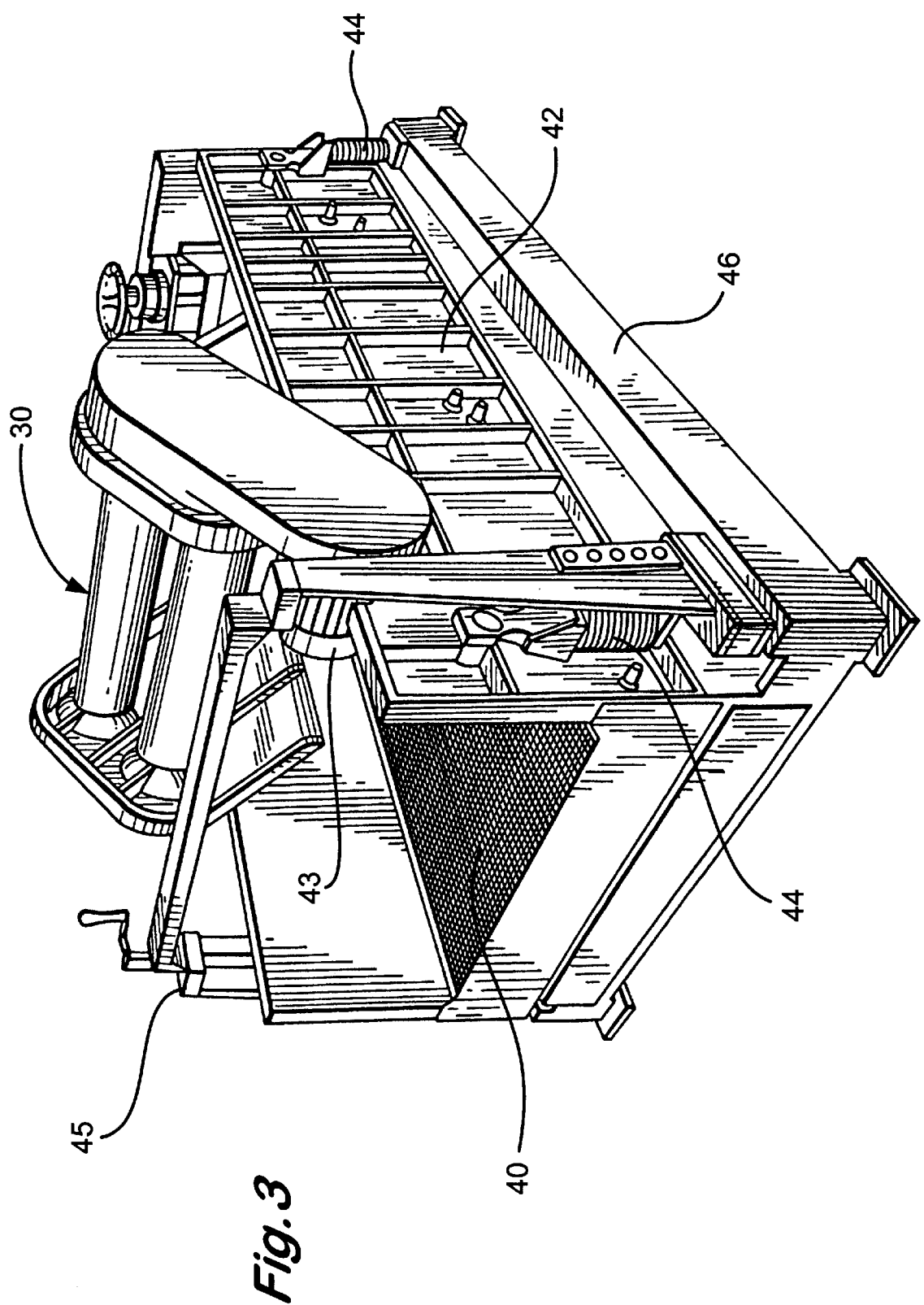
FIG. 3 is a perspective view of a shaker with a screen as in FIG. 1A according to the present invention.

FIG. 3 shows a vibratory separator system 30 according to the present invention that has a screen 40 (like any screen disclosed herein) according to the present invention mounted on vibratable screen mounting apparatus or "basket" 42. The screen 40 may be any screen disclosed herein or have any combination of any feature or features of any screen or screen part disclosed herein; and any such screen may be used with any appropriate shaker or screening apparatus. The basket 42 is mounted on springs 44 (only two shown; two as shown are on the opposite side) which are supported from a frame 46. The basket 42 is vibrated by a motor 43 and interconnected vibrating apparatus 48 which is mounted on the basket 42 for vibrating the basket and the screens. Elevator apparatus 45 provides for raising and lowering of the basket end.

Figure 4:
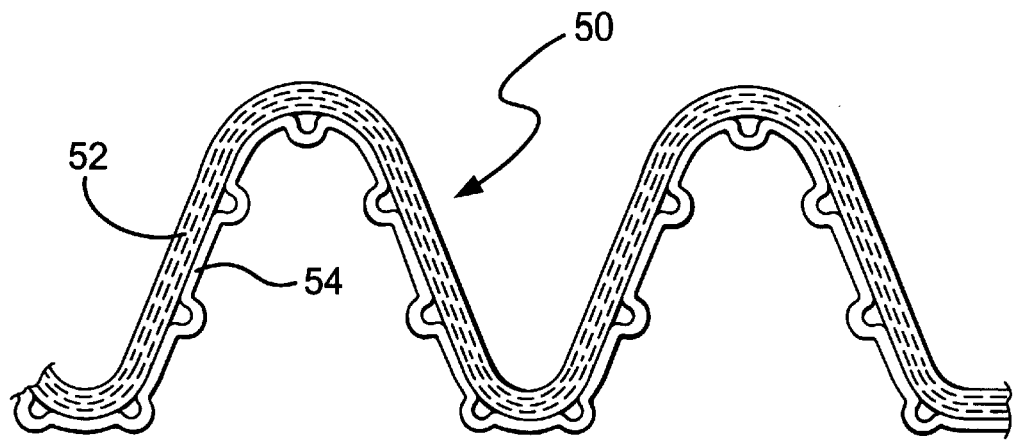
FIGS. 4 and 5 are schematic side views in cross-section of screens according to the present invention.
Figure 5:
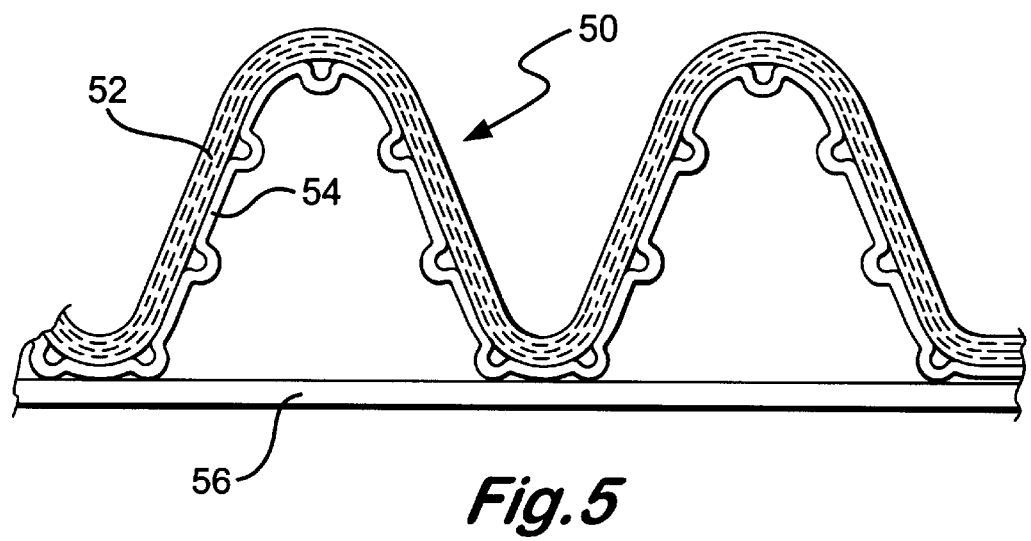

It is also within the scope of this invention to use flattopped wire cloth as a lower support for a screen assembly with undulating screening material instead of (or in addition to) known lower apertured or perforated plates, support frames or other lower support strips or members, including, but not limited to, a screen assembly with the flat-topped wire cloth (instead of or in addition to the plate, frame etc.) as shown in the following U.S. Patents, incorporated fully herein for all purposes: U.S. Pat. Nos. 5,944,993; 5,720,881; 5,417,858; 5,417,859; 5,636,749; 5,417,793; 5,720,881; 5,598,930; 5,490,598; and 5,551,575. FIG. 4 shows schematically a screen 50 according to the present invention with screening material 52 (which may be one, two, three or more layers of screening material, optionally bonded and/or glued and/or sintered together) on a lower flat-top wire screen material or wire cloth support 54 (e.g. but not limited to wire cloth as shown in U.S. Pat. No. 1,814,598 or flat top screen material as commercially available from Universal Wire Cloth of Morrisville, Pa.). FIG. 5 shows a screen 50 with an optional support 56 (shown schematically) below the flat-top wire cloth 54. The item 56 represents any known lower support for a screen, including, but not limited to an apertured plate, perforated plate, series of strips or straps, and/or strip support member, including, but not limited to, any such as disclosed in any of the patents listed earlier in this paragraph.

The present invention, therefore, in some, but not necessarily all, embodiments, provides a screen for a vibratory separator or shaker for treating material flowing thereto, e.g.

but not limited to drilling fluids, the screen having a lower support made of criss-crossed wires which define a plurality of spaced-apart holes through the lower support, the criss-crossed wires having top surfaces or portions of top surfaces with a substantially flat portion, and screening material on the top portions or surfaces of the crisscrossed wires. Such a screen may have one, some, or all of the following features or aspects: wherein the screening material is bonded and/or sintered to the top surfaces of the wires; wherein the screening material is a plurality of layers of screening material; wherein the plurality of layers includes at least one, two, three or more layers of relatively fine screening material on top of a layer of relatively coarse screen material; wherein the plurality of crisscrossed wires is flat wire cloth; wherein the lower support is substantially horizontal; wherein the lower support is undulating in shape; wherein the screening material is substantially flat or has an undulating shape corresponding to an undulating shape of the lower support; wherein the screen has two pairs of opposed spaced-apart sides and each side of one pair of sides has a hookstrip channel, or other screen mounting structure therealong; wherein the screen has two pairs of spaced-apart side members connected to the lower support and screening material; wherein the side members are made of material from the group consisting of metal, plastic, aluminum, steel, cured glue, rubber, PTFE, and seal material; wherein the crisscrossed wires range in diameter between about 0.0375 inches and about 0.162 inches.

The present invention, therefore, in some, but not necessarily all, embodiments, provides a screen for a vibratory shaker for treating material flowing thereto, the screen having a lower support made of crisscrossed wires which define a plurality of spaced-apart holes through the lower support, the crisscrossed wires having top surfaces with a substantially flat portion, screening material on the top surfaces of the crisscrossed wires, the screening material bonded or sintered to the top surfaces of the wires, and the plurality of layers including at least one layer of relatively fine screen material on top of a layer of relatively coarse screen material; such a screen wherein the plurality of crisscrossed wires comprises flat wire cloth; and/or such a screen wherein the crisscrossed wires range in diameter between about 0.0375 inches and about 0.162 inches.

The present invention, therefore, in some, but not necessarily all, embodiments, provides a method for screening material flowing to a vibratory shaker, the method including flowing the material to a screen, according to the present invention, on the vibratory shaker, and screening the material with the screen.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in S 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A screen for a vibratory shaker for treating drilling fluid flowing thereto, the screen comprising a lowermost bottom support made of criss-crossed wires which define a plurality of spaced-apart holes through the lower support, the criss-crossed wires having top surfaces with a substantially flat portion, and wherein the criss-crossed wires range in diameter between about 0.0375 and about 0.162 inches, and screening material on the top surfaces of the criss-crossed wires, the screening material connected to the substantially flat surfaces of the top surfaces of the wires, and the lowermost bottom support supporting the screening material.

2. The screen of claim 1 wherein the screening material comprises a plurality of layers of screening material.

3. The screen of claim 2 wherein the plurality of layers includes at least one layer of relatively fine screen material on top of a layer of relatively coarse screen material.

4. The screen of claim 1 wherein the plurality of criss-crossed wires comprise flat wire cloth.

5. The screen of claim 1 wherein the lowermost bottom support is substantially horizontal.

6. The screen of claim 1 wherein the lowermost bottom support i undulating in shape.

7. The screen of claim 1 wherein the screening material has an undulating shape corresponding to the undulating shape of the lowermost bottom support.

8. The screen of claim 1 wherein the screen has two pairs of opposed spaced-apart sides and each side of one pair of sides has a hookstrip therealong.

9. The screen of claim 1 wherein the screen has two pairs of spaced-apart side members connected to the lowermost bottom support and screening material.

10. The screen of claim 9 wherein the side members are made of material from the group consisting of metal, plastic, aluminum, steel, cured glue, rubber, PTFE, and seal material.

11. A method for screening drilling fluid flowing to a vibratory shaker, the method comprising flowing the drilling fluid to a screen on the vibratory shaker, the screen comprising a lowermost bottom support made of criss-crossed wires which define a plurality of spaced-apart holes through the lower support, the criss-crossed wires having top surfaces with a substantially flat portion, and wherein the criss-crossed wires range in diameter between about 0.0375 and about 0.162 inches, and screening material on the top surfaces of the crisscrossed wires, the screening material connected to the substantially flat surfaces of the top surfaces of the wires, and the lowermost bottom support supporting the screening material, and screening the drilling fluid with the screen.

12. The method of claim 11 wherein the plurality of criss-crossed wires comprise flat wire cloth.

13. The method of claim 11 wherein the screening material lies substantially horizontally.

14. The method of claim 11 wherein the lowermost bottom support is substantially horizontal.

15. The method of claim 11 wherein the lowermost bottom support is undulating in shape.

* * * * *